(12) United States Patent
Bourque et al.

(10) Patent No.: US 11,797,819 B2
(45) Date of Patent: Oct. 24, 2023

(54) RFID WRISTBAND

(71) Applicants: AVERY DENNISON RETAIL INFORMATION SERVICES, LLC, Mentor, OH (US); RFID N PRINT PTY LTD, Warnervale (AU)

(72) Inventors: Douglas J. Bourque, Rowlett, TX (US); Bruce Hegan, Jilliby (AU)

(73) Assignee: Avery Dennison Retail Information Services LLC, Mentor, OH (US)

( * ) Notice: Subject to any disclaimer, the term of this patent is extended or adjusted under 35 U.S.C. 154(b) by 298 days.

(21) Appl. No.: 16/136,869

(22) Filed: Sep. 20, 2018

(65) Prior Publication Data
US 2019/0087705 A1 Mar. 21, 2019

Related U.S. Application Data

(60) Provisional application No. 62/560,988, filed on Sep. 20, 2017.

(51) Int. Cl.
*G06K 19/077* (2006.01)
*G06K 7/10* (2006.01)
*G09F 3/00* (2006.01)

(52) U.S. Cl.
CPC ... *G06K 19/07762* (2013.01); *G06K 7/10396* (2013.01); *G09F 3/005* (2013.01)

(58) Field of Classification Search
CPC ......... G06K 19/07762; G06K 19/0776; G06K 19/07758; G06K 7/10396; G06K 19/007762; G06K 7/10; G09F 3/005
See application file for complete search history.

(56) References Cited

U.S. PATENT DOCUMENTS

| | | | | |
|---|---|---|---|---|
| 4,199,882 A | * | 4/1980 | Clayman | G09F 3/005 40/633 |
| 4,914,843 A | * | 4/1990 | DeWoskin | G09F 3/005 283/75 |
| 5,986,562 A | * | 11/1999 | Nikolich | G06K 7/0008 340/693.5 |
| 6,016,618 A | * | 1/2000 | Attia | G09F 3/005 156/289 |

(Continued)

FOREIGN PATENT DOCUMENTS

DE 102011106275 1/2013

OTHER PUBLICATIONS

International Search Report and Written Opinion of ISA/EPO prepared for PCTUS2018/051973 dated Jan. 11, 2019.

(Continued)

*Primary Examiner* — Daniel I Walsh

(57) ABSTRACT

A wearable RFID device is disclosed herein. The wearable RFID device is preferably comprised of a band, one or more RFID inlays attached to a backside of said band, and at least one tamper resistant cut or notch in one or more of the band and/or the RFID inlays so that the RFID inlay(s) are rendered inoperable or destroyed when the wearable RFID device is removed from the user. The band is preferably formed by attaching a first and a second end of the band with an adhesive to form an adhesive closure, and the RFID inlay may be positioned on either side of, or extend across, the adhesive closure to suit user preference or other design considerations.

10 Claims, 17 Drawing Sheets

(56) References Cited

U.S. PATENT DOCUMENTS

| | | | | |
|---|---|---|---|---|
| 6,050,622 A * | 4/2000 | Gustafson | | E06B 9/68 |
| | | | | 292/307 R |
| 6,349,493 B1 * | 2/2002 | Newman | | G09F 3/005 |
| | | | | 40/633 |
| 6,782,648 B1 * | 8/2004 | Mosher, Jr. | | G09F 3/005 |
| | | | | 40/633 |
| 6,836,215 B1 * | 12/2004 | Laurash | | G06K 1/12 |
| | | | | 156/60 |
| 7,137,216 B2 * | 11/2006 | Ali | | G09F 3/005 |
| | | | | 40/633 |
| 7,197,842 B2 * | 4/2007 | Ali | | G09F 3/005 |
| | | | | 40/633 |
| 7,765,728 B1 * | 8/2010 | Waggoner | | G09F 3/005 |
| | | | | 283/75 |
| 8,181,994 B1 * | 5/2012 | Valenti, Jr. | | B42D 15/00 |
| | | | | 283/108 |
| 9,477,922 B2 * | 10/2016 | Krishna | | G06K 7/10316 |
| 10,062,025 B2 * | 8/2018 | Roesner | | G06K 19/0723 |
| 10,144,568 B2 | 12/2018 | Simonetti et al. | | |
| D918,877 S * | 5/2021 | Benli | | D14/230 |
| 2002/0084904 A1 * | 7/2002 | De La Huerga | | |
| | | | | G06K 19/07762 |
| | | | | 340/573.4 |
| 2003/0174049 A1 * | 9/2003 | Beigel | | G06K 19/0723 |
| | | | | 340/10.42 |
| 2003/0213842 A1 * | 11/2003 | Jackson | | G06K 19/06009 |
| | | | | 235/380 |
| 2003/0221366 A1 * | 12/2003 | Weiner | | A44C 5/003 |
| | | | | 47/65.7 |
| 2004/0056769 A1 * | 3/2004 | Peterson | | G09F 3/005 |
| | | | | 340/572.8 |
| 2004/0104274 A1 * | 6/2004 | Kotik | | G06K 19/0716 |
| | | | | 235/492 |
| 2004/0162739 A1 | 8/2004 | Lax | | |
| 2004/0189470 A1 * | 9/2004 | Girvin | | G08B 13/2454 |
| | | | | 340/568.2 |
| 2004/0237367 A1 * | 12/2004 | Ali | | G09F 3/005 |
| | | | | 40/633 |
| 2004/0257229 A1 * | 12/2004 | Girvin | | G06K 19/0739 |
| | | | | 340/568.2 |
| 2005/0108912 A1 * | 5/2005 | Bekker | | A01K 11/006 |
| | | | | 40/633 |
| 2005/0146435 A1 * | 7/2005 | Girvin | | G06K 19/0739 |
| | | | | 340/568.2 |
| 2005/0248458 A1 * | 11/2005 | Girvin | | G06K 19/07749 |
| | | | | 340/568.2 |
| 2005/0262747 A1 * | 12/2005 | Ali | | G09F 3/005 |
| | | | | 40/633 |
| 2006/0076402 A1 * | 4/2006 | Lerch | | G06Q 20/40 |
| | | | | 235/380 |
| 2006/0077060 A1 * | 4/2006 | Lerch | | G08B 21/0286 |
| | | | | 340/572.3 |
| 2006/0080819 A1 * | 4/2006 | McAllister | | G06K 17/00 |
| | | | | 29/403.3 |
| 2006/0087437 A1 * | 4/2006 | Lerch | | G06K 19/07749 |
| | | | | 340/568.2 |
| 2006/0087438 A1 * | 4/2006 | Lerch | | G06K 19/07762 |
| | | | | 340/568.2 |
| 2006/0202829 A1 * | 9/2006 | Girvin | | G06K 19/07381 |
| | | | | 340/572.9 |
| 2006/0230661 A1 * | 10/2006 | Bekker | | G09F 3/005 |
| | | | | 40/633 |
| 2006/0236578 A1 * | 10/2006 | Saint | | G09F 3/005 |
| | | | | 40/633 |
| 2007/0028495 A1 * | 2/2007 | Kotik | | G16H 10/65 |
| | | | | 40/633 |
| 2007/0069895 A1 * | 3/2007 | Koh | | G06K 19/02 |
| | | | | 340/572.1 |
| 2007/0115129 A1 * | 5/2007 | Kessler | | G06K 19/07345 |
| | | | | 340/572.3 |
| 2007/0120687 A1 * | 5/2007 | Lerch | | G06K 19/04 |
| | | | | 340/568.2 |
| 2007/0145150 A1 * | 6/2007 | Barczyk | | G06K 19/07749 |
| | | | | 235/492 |
| 2007/0188327 A1 * | 8/2007 | Keeton | | H01Q 1/22 |
| | | | | 340/572.7 |
| 2007/0257113 A1 * | 11/2007 | Davis | | A61B 90/90 |
| | | | | 235/462.01 |
| 2007/0275356 A1 * | 11/2007 | Murphy | | G09B 1/28 |
| | | | | 434/99 |
| 2008/0290176 A1 * | 11/2008 | Fleet | | G06K 19/07749 |
| | | | | 235/492 |
| 2009/0009412 A1 * | 1/2009 | Warther | | G06K 19/041 |
| | | | | 343/718 |
| 2009/0094872 A1 * | 4/2009 | Ali | | G09F 3/005 |
| | | | | 40/633 |
| 2010/0024268 A1 * | 2/2010 | Landsman | | G09F 3/005 |
| | | | | 40/633 |
| 2010/0058636 A1 * | 3/2010 | Kerlin | | G09F 3/005 |
| | | | | 24/304 |
| 2010/0065647 A1 * | 3/2010 | Ritamaki | | G06K 19/041 |
| | | | | 235/492 |
| 2010/0134291 A1 * | 6/2010 | Lavedas | | G06K 19/07749 |
| | | | | 340/572.7 |
| 2010/0327002 A1 * | 12/2010 | Hegan | | G09F 3/005 |
| | | | | 221/30 |
| 2011/0041370 A1 * | 2/2011 | Saint | | G09F 3/005 |
| | | | | 40/633 |
| 2011/0042933 A1 * | 2/2011 | Landsman | | G09F 3/005 |
| | | | | 283/70 |
| 2011/0057042 A1 * | 3/2011 | Duggan | | G06K 19/07749 |
| | | | | 235/492 |
| 2011/0107637 A1 * | 5/2011 | Bekker | | A61B 90/96 |
| | | | | 40/633 |
| 2012/0036753 A1 * | 2/2012 | Landsman | | A61B 5/6831 |
| | | | | 156/289 |
| 2012/0056719 A1 * | 3/2012 | Krishna | | G06K 7/10316 |
| | | | | 340/10.1 |
| 2012/0062368 A1 * | 3/2012 | Graells Ferrandez | | |
| | | | | G09F 3/0297 |
| | | | | 340/10.1 |
| 2014/0110445 A1 * | 4/2014 | Eisner | | A44C 5/003 |
| | | | | 224/222 |
| 2015/0041547 A1 * | 2/2015 | Sofoulis | | G06K 7/10009 |
| | | | | 235/492 |
| 2015/0042450 A1 * | 2/2015 | McLear | | G07C 9/00111 |
| | | | | 340/5.25 |
| 2015/0077257 A1 * | 3/2015 | Pokrajac | | G08B 21/22 |
| | | | | 340/572.8 |
| 2016/0005339 A1 * | 1/2016 | Waltersdorf | | G09F 3/201 |
| | | | | 40/633 |
| 2016/0078787 A1 * | 3/2016 | Canchola | | B01L 3/5453 |
| | | | | 40/633 |
| 2016/0172742 A1 * | 6/2016 | Forster | | G08B 13/2428 |
| | | | | 343/878 |
| 2018/0151092 A1 * | 5/2018 | Becker | | G09F 3/005 |
| 2019/0087705 A1 * | 3/2019 | Bourque | | G06K 19/07762 |
| 2020/0384287 A1 * | 12/2020 | Hetz | | A61N 5/0613 |

OTHER PUBLICATIONS

International Preliminary Report on Patentability dated Apr. 2, 2020 issued in corresponding IA No. PCT/US2018/051973 filed Sep. 20, 2018.

* cited by examiner

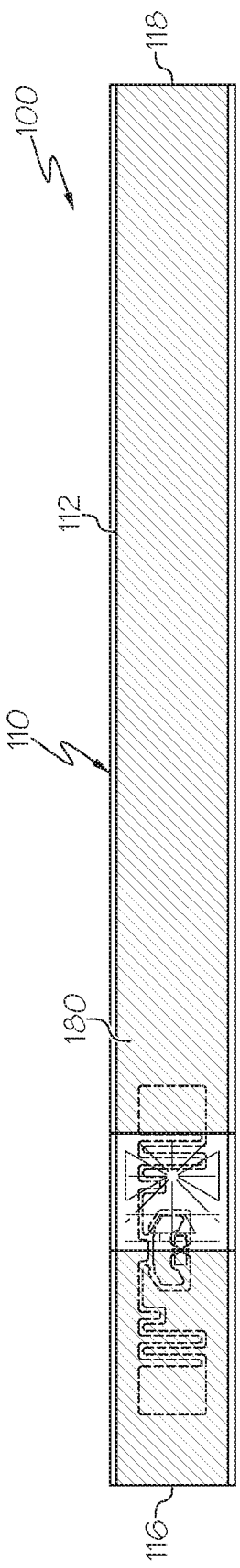
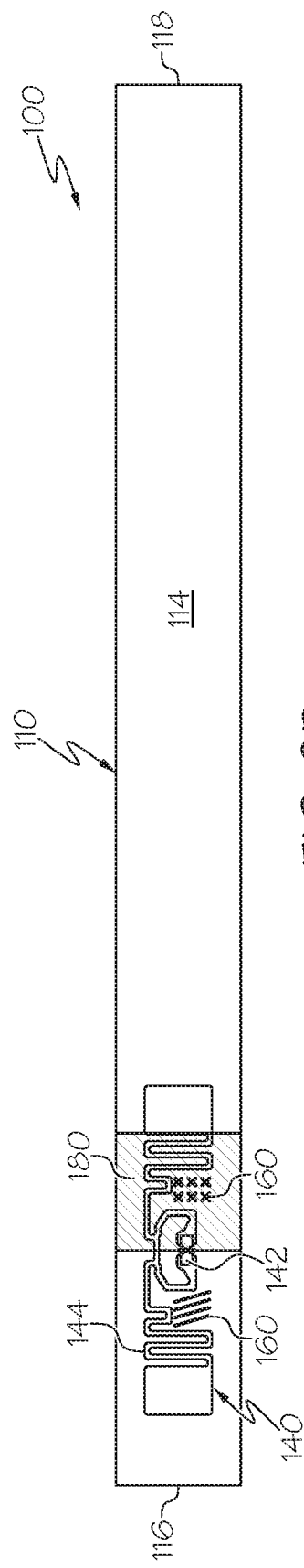

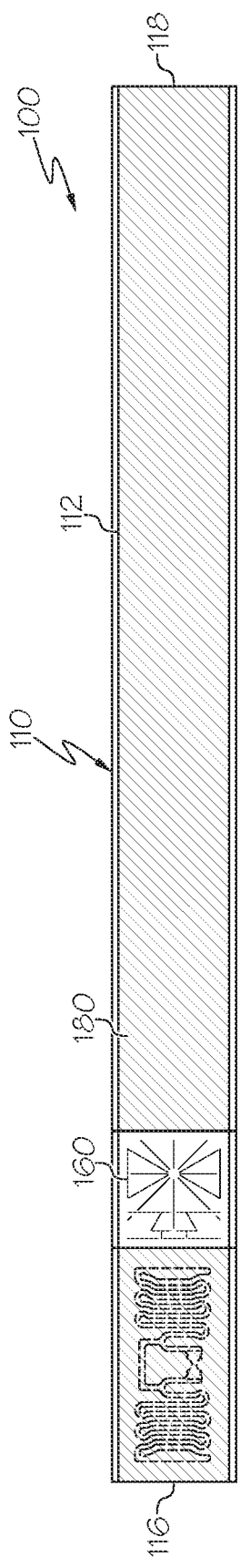
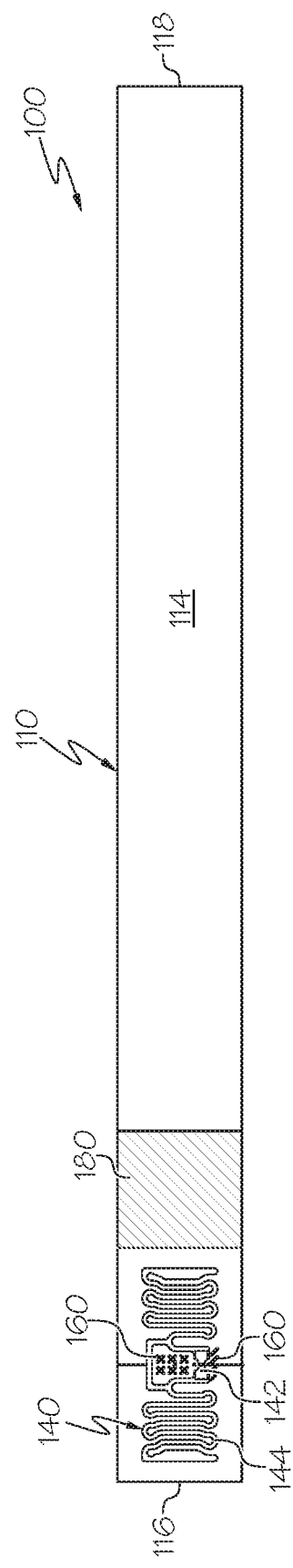

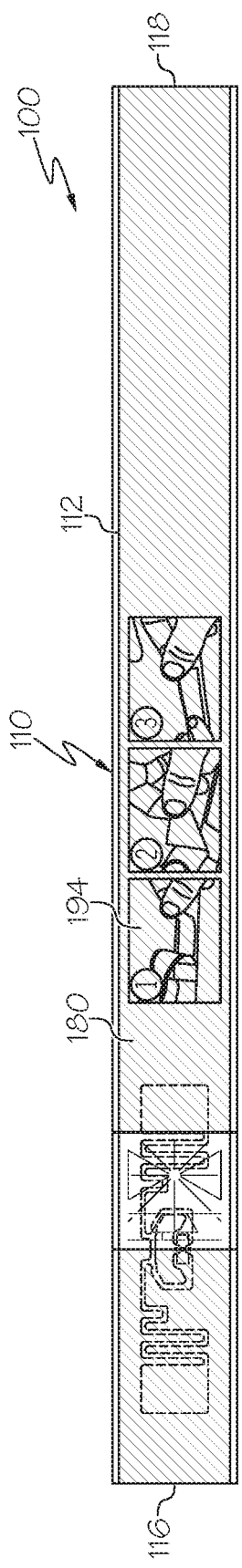
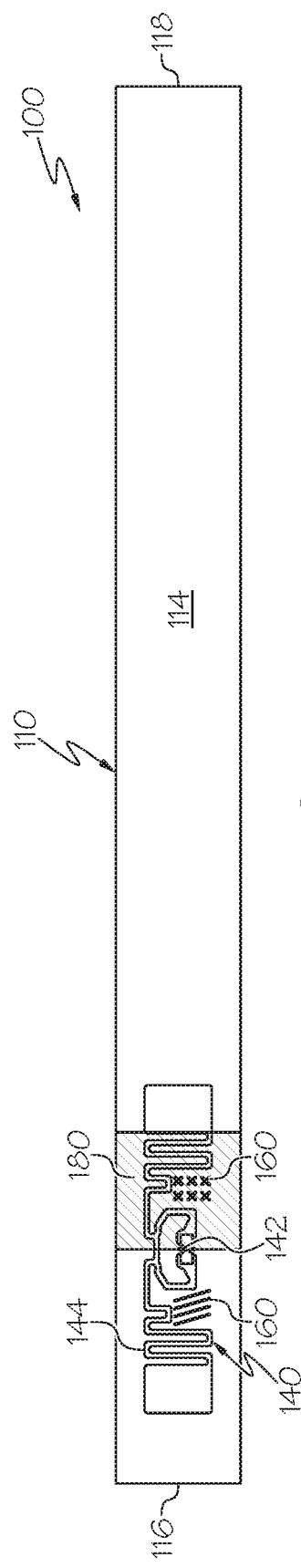
FIG. 11C
FIG. 11D

RFID WRISTBAND

CROSS REFERENCE TO RELATED APPLICATION(S)

The present application claims priority to and the benefit of U.S. Provisional Patent Application No. 62/560,988 filed Sep. 20, 2017, which is incorporated herein by reference in its entirety.

BACKGROUND

The present invention relates generally to a band, such as a wristband or ankle band, that comprises one or more radio-frequency identification (RFID) inlays that will become disabled upon removal of the band. The band can be worn by a person or an animal, or placed on virtually any type of object wherein the remote tracking of the same is desirable. Specifically, the RFID inlays can be either single RFID inlays or dual RFID inlays and allow access control and tracking for multiple markets. The present subject matter is especially suitable for healthcare patient and vendor tracking and management, controlling access to a particular location, managing cashless payments, providing social media access, and tracking vendor information at fairs, festivals, hospitality events, markets, bars, cruise ships and the like. Accordingly, the present specification makes specific reference thereto. However, it is to be appreciated that aspects of the present inventive subject matter are also equally amenable to other similar applications.

By way of background, RFID is the use of electromagnetic energy (EM energy) to stimulate a responsive device (known as an RFID "tag" or transponder) to identify itself and in some cases, provide additionally stored data. RFID tags typically include a semiconductor device commonly referred to as the "microchip" or "chip" upon which a memory and operating circuitry are formed, and which is connected to an antenna. Typically, RFID tags act as transponders, providing information stored in the chip memory in response to a radio frequency (RF) interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. This configuration represents the low cost end of the technology in that the RFID tag may be a read-only or a read/write tag and it responds to an interrogation signal with its identification number or memory stored on the chip. Typically, the tag while being interrogated by the reader will continuously respond with its identification number and/or memory information stored on the chip. These tags are very low cost and are produced in enormous quantities.

Such RFID tags typically are permanently attached to an article to be tracked and, once attached, the serial number of the tag is associated with its host article in a computer database. Specifically, an object of the tag is to associate it with an article throughout the article's life in a particular facility, such as a manufacturing facility, a transport vehicle, a health care facility, a pharmacy storage area, or other environment, so that the article may be located, identified, and tracked, as it is moved. Tracking the articles through the facility can assist in generating more efficient dispensing and inventory control systems as well as improving work flow in a facility. This results in better inventory control and lowered costs.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a large number of applications.

Depending on the requirements of the RFID tag application, such as the physical size of the articles to be identified, their location, and the ability to reach them easily, tags may need to be read from a short distance or a long distance by an RFID reader. Furthermore, the read range (i.e., the range of the interrogation and/or response signals) of RFID tags is also limited.

Returning to the current context of the present invention, healthcare facilities, for example, typically passively identify and/or track patients using wristbands placed at the time of arrival, and removed upon departure. Identifying information on the bands may be used to indicate patient identifying data, allergies to medications, risk of falling, medical records, medication administration, etc. Information may be identified through color coding, printing, bar codes, and the like. RFID technology incorporated into a wristband would provide an additional way to store and access this data. However, current RFID technology used for patient tracking requires the use of a spacer added to the band positional between the RFID device and the patient's skin to be readable at any distance away from the patient. Additionally, the Health Insurance Portability and Accountability Act of 1996 require hospitals and health providers to protect and safeguard protected health information. Existing wristbands must be physically destroyed and disposed of once removed from the patient. Similarly, bands that could be used to track people at a venue and manage cashless monetary transfers would need to have that information similarly safeguarded. Another limitation of current bands is that new information is not readily remotely uploadable/downloadable to the wristband. Therefore, every time information changes, such as a medication administration, a new band would be required so that trackable information is kept current.

Therefore, there is a long felt need in the art for a wearable device such as a wristband with a RFID inlay that can be successfully read at a desired distance without the need for a spacer to be added to the back of the inlay above the user's skin. There is also a long felt need in the art for a wearable RFID device that is destroyed or rendered unusable when it is removed from the wearer or object to alleviate the need to secure and later destroy any information contained thereon, and to prohibit the reuse of the wearable device by unauthorized persons.

The present invention discloses a device for RFID enabling a wearable wristband for adding and storing information that is readable at a distance and where the stored information is irretrievable once the device is removed. More specifically, the present invention discloses an RFID inlay wristband that comprises either a single or dual RFID inlay, depending on user requirements or preferences, and a plurality of tamper resistant or security cuts that extend onto the RFID inlay(s) such that when the device is removed from the wearer or object to which it is attached, the wristband and the RFID inlay(s) are destroyed or will no longer function.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a wearable device for storing, transmitting, encoding and receiving information remotely via RFID. The device preferably comprises a band; at least one RFID inlay attached to the band; and at least one security cut positioned along a portion of the band and extending into the RFID inlay. In another embodiment of the present invention, the device further comprises an adhesive closure useful in forming the band and strategically positioned in relationship to the RFID inlay.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 8C illustrates a perspective view of the front of an alternative embodiment of a wearable RFID device of the present invention in accordance with the disclosed architecture.

FIG. 8D illustrates a perspective view of the back of the wearable RFID device of FIG. 8C with an alternative embodiment of the RFID inlay of the present invention disclosed thereon.

FIG. 10A illustrates a perspective view of the front of a further alternative embodiment of a wearable RFID device of the present invention in accordance with the disclosed architecture.

FIG. 10B illustrates a perspective view of the back of the wearable RFID device of FIG. 10A with one embodiment of the RFID inlay of the present invention disclosed thereon.

FIG. 11C illustrates a perspective view of the front of a further alternative embodiment of a wearable RFID device of the present invention in accordance with the disclosed architecture.

FIG. 11D illustrates a perspective view of the back of the wearable RFID device of FIG. 11C with an alternative embodiment of the RFID inlay of the present invention disclosed thereon.

DETAILED DESCRIPTION

Figure 1A:
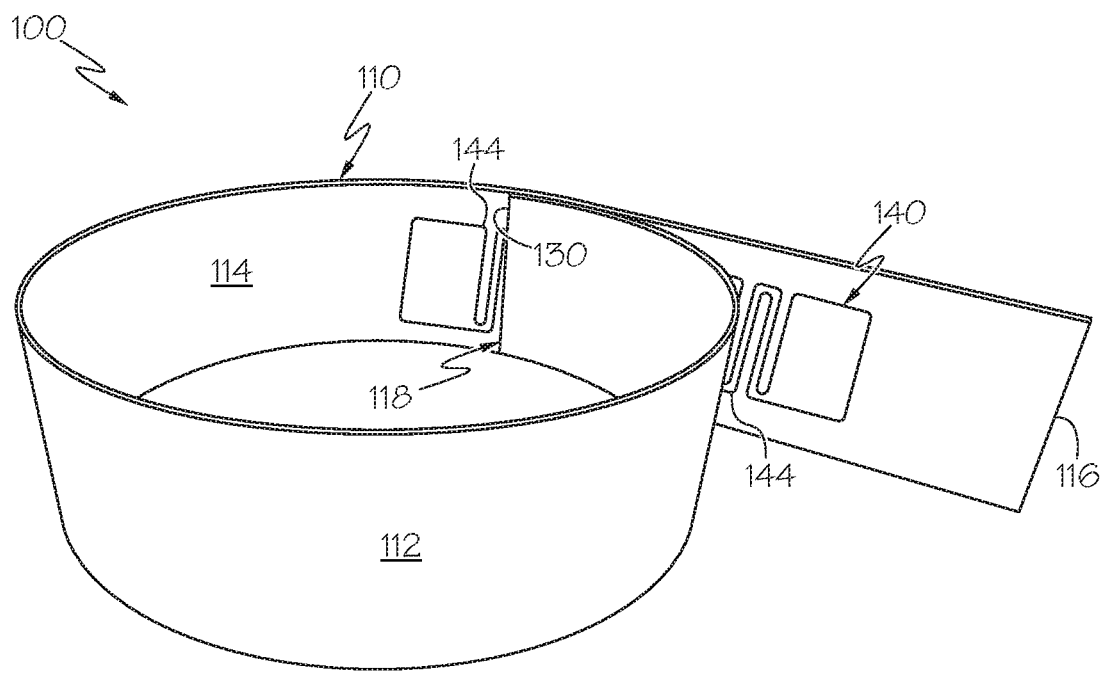
FIG. 1A illustrates a perspective view of one embodiment of the wearable RFID device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Generally stated, the present invention discloses a wearable device capable of receiving, transmitting and storing information via RFID, and that is destroyed or rendered inoperable upon removal from the wearer. Referring initially to the drawings, FIG. 1 illustrates a perspective view of one embodiment of the wearable RFID device 100 of the present invention in accordance with the disclosed architecture. Device 100 is preferably comprised of a wearable band 110, and RFID inlay 140, a plurality of tamper resistant cuts 160 and an adhesive 180. Band 110 is preferably an elongated strip of material comprised of a front 112, a back 114, a first end 116 and an opposing second end 118 that can be joined to first end to form an adhesive closure 130. Band 110 may be comprised of any suitable material including but not limited to, Direct Thermal, Synthetic paper, etc., and may also accept printing on the front 112 or back 114 to suit user preference.

Figure 1B:
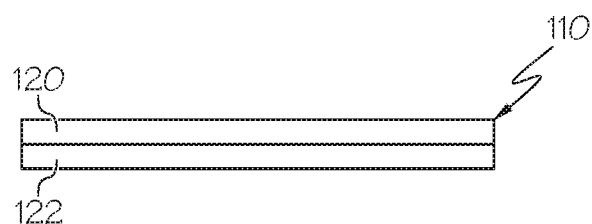
FIG. 1B illustrates an elevational view of one embodiment of the band of the wearable RFID device of the present invention in accordance with the disclosed architecture.

As best shown in FIG. 1B, band 110 may also be comprised of one or more layers. For example, band 110 may be comprised of a base layer 120. The present invention contemplates that the base layer 20 may be made out of synthetic paper, soft underlay, or paper, but is not limited to such, and is overlaid with a laminate layer 122, such as a medical grade laminate, to protect a user 190 or wearer's skin. Alternatively, base layer 120 may be sandwiched between two or more laminate layers 122 so that device 100 could be worn with either the front 116 or the back 118 facing outwardly from the user's appendage.

Figure 2:
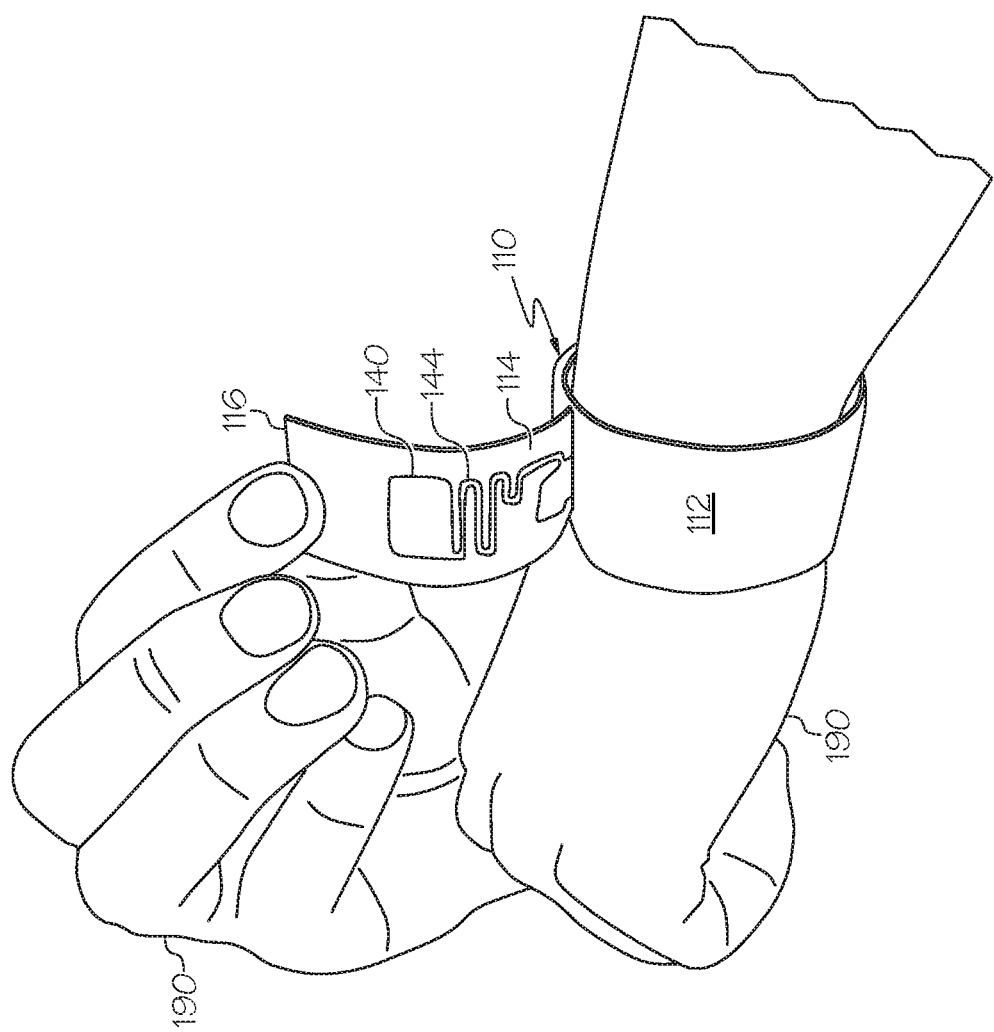
FIG. 2 illustrates a perspective view of a user installing the wearable RFID device of the present invention on the user's wrist in accordance with the disclosed architecture.
Figure 3:
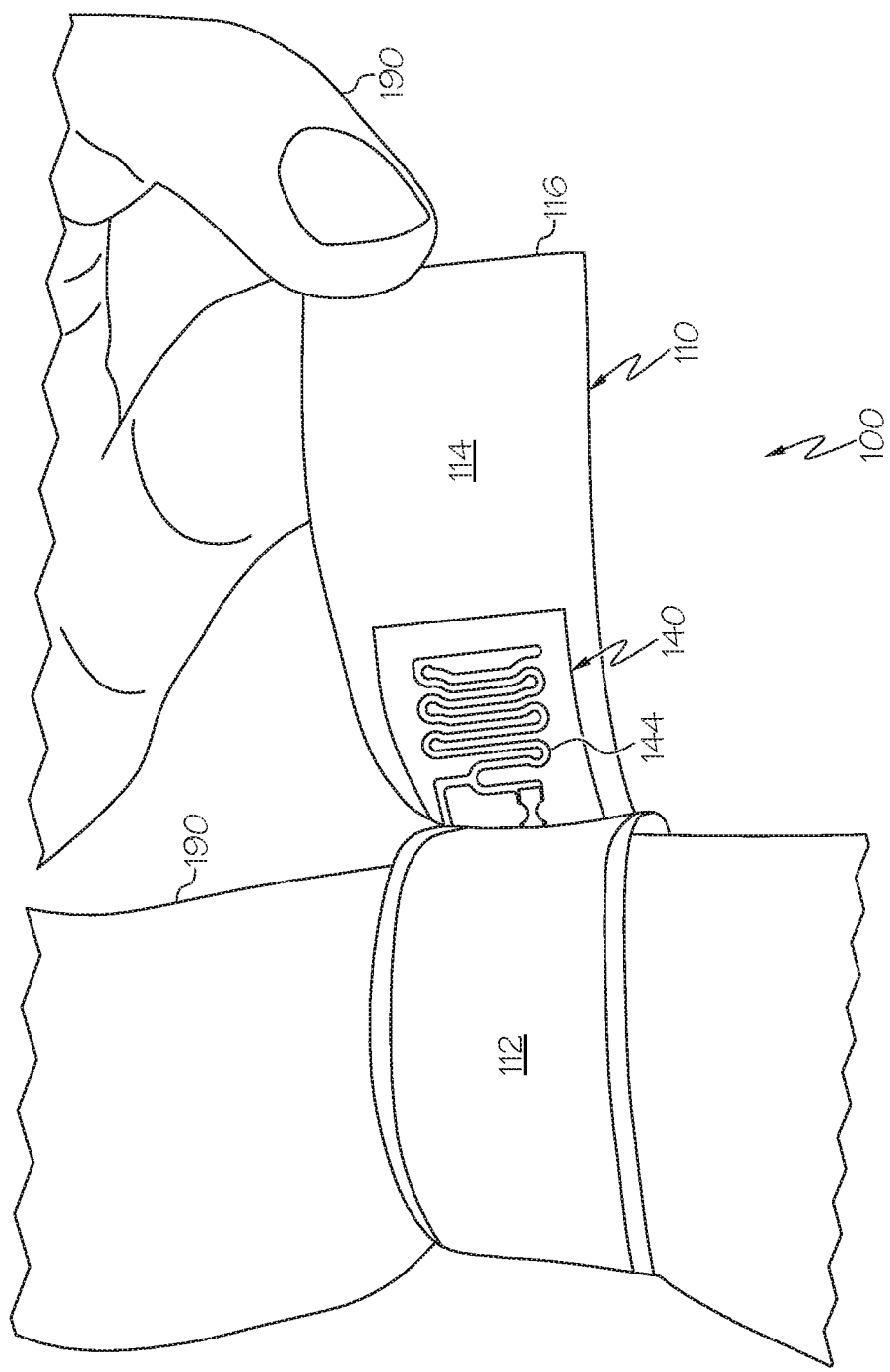
FIG. 3 illustrates a perspective view of a user installing the wearable RFID device of the present invention on the user's wrist in accordance with the disclosed architecture.

FIGS. 2-3 illustrate a perspective view of user 190 installing wearable RFID device 100 on the user's wrist in accordance with the disclosed architecture. More specifically, user 190 will wrap band 110 around the wrist or other appendage of the user, animal or other object such that a portion of first end 116 will overlap or overlay over a portion of second end 118 to form adhesive closure 130, as best shown in FIG. 1-3.

Figure 4:
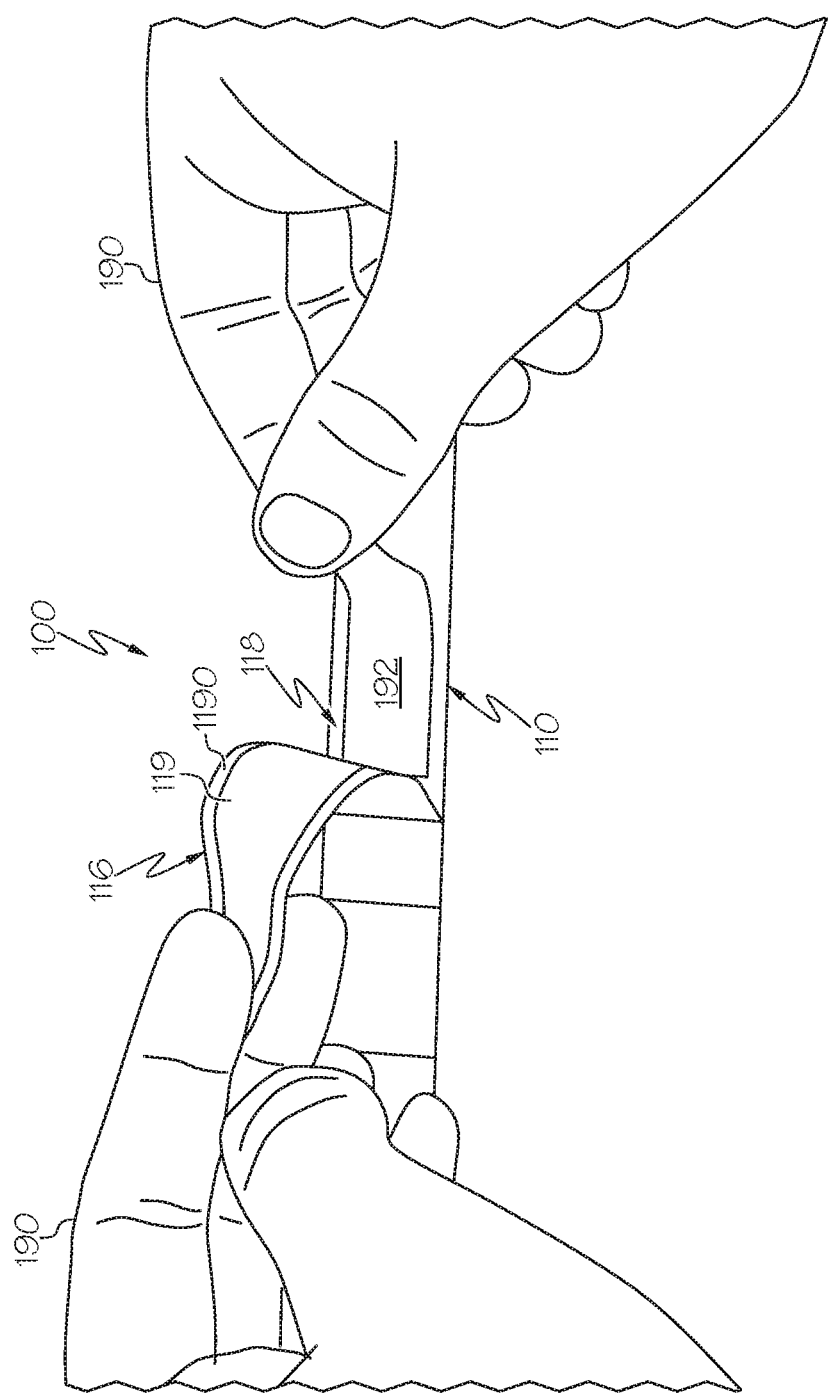
FIG. 4 illustrates a perspective view of a user installing an optional user supplied label on the wearable RFID device of the present invention in accordance with the disclosed architecture.
Figure 5:
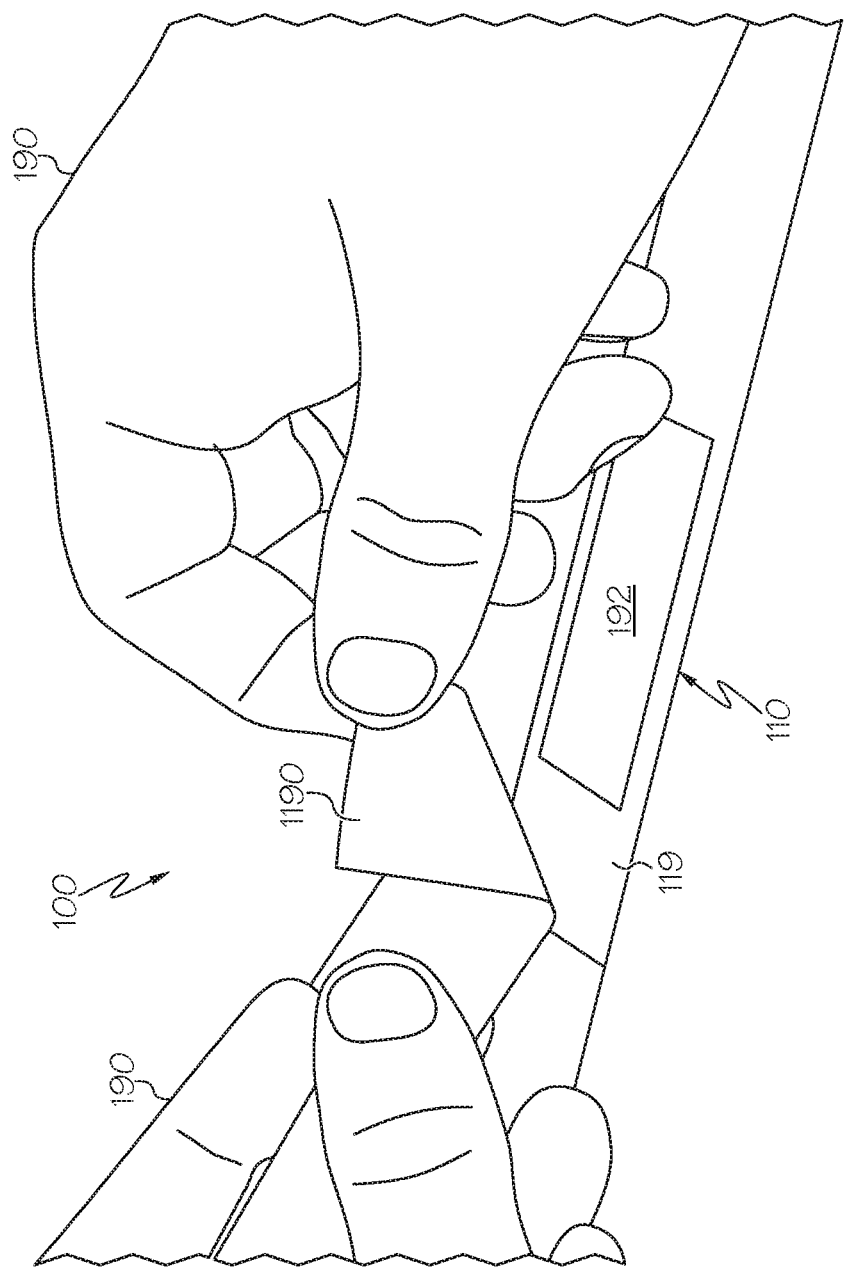
FIG. 5 illustrates a perspective view of a user further installing the label on the wearable RFID device of the present invention by removing a backing from a transparent label flap that will be overlaid onto the label to protect the same.
Figure 6:
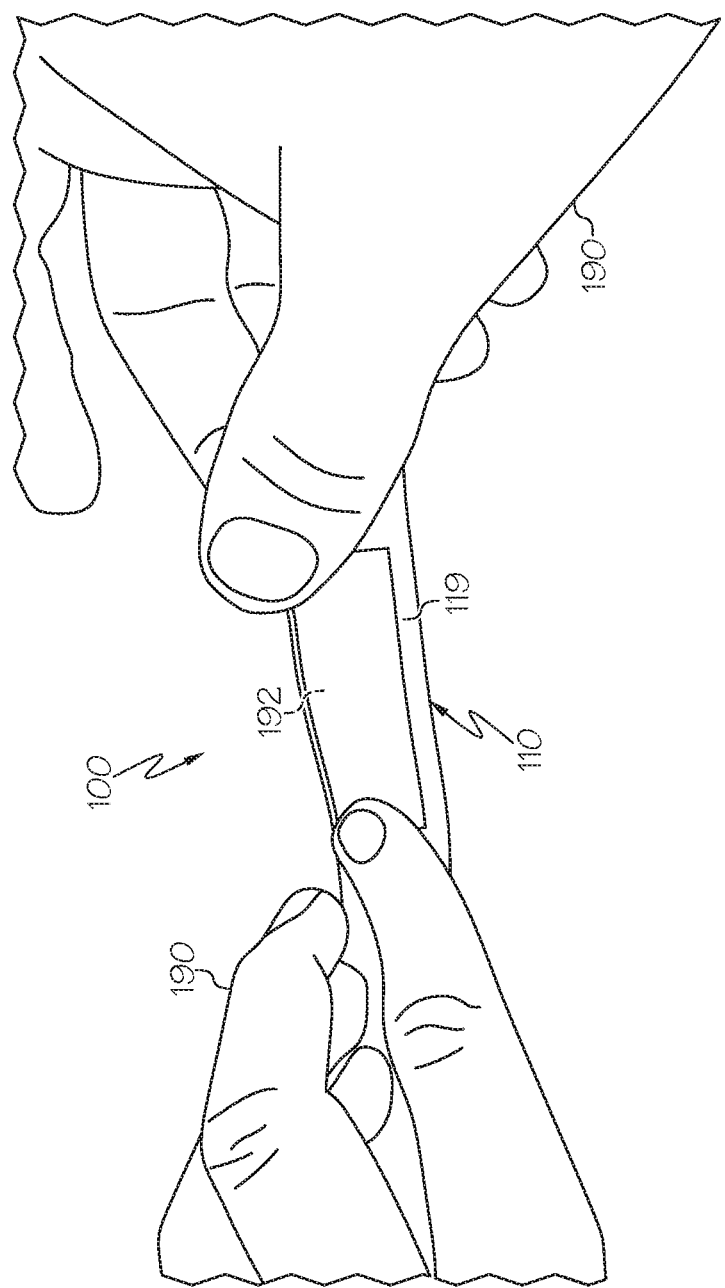
FIG. 6 illustrates a perspective view of a user completing the installation of the label on the wearable RFID device of the present invention by overlaying the transparent flap over the label. The label affixed to the wristband, in one embodiment, may contain patient information that is printed on-demand. In such an embodiment, the overlaying transparent flap has a backing paper that is removed and the transparent flap is sealed across the label thereby protecting the label and also prevents label information being altered, called "peel n seal."

Additionally, one or more of first and second ends 116, 118 may further comprise a transparent overlay pressure sensitive flap 119 that can be positioned over a user supplied media 192 to secure the same to device 100. The user supplied media 192 will enable user 190 to add additional information to device 100, and display the same in a protected manner beneath label 192. By way of example, FIG. 4 illustrates a perspective view of user 190 installing media 192 on second end 118 of band 110 and preparing to overlay flap 119, which is positioned on first end 116, overtop of media 192 and a portion of second end 118. In accordance therewith, FIG. 5 illustrates a perspective view of user 190 further installing media 192 onto band 110 by removing a backing 1190 from flap 119, and FIG. 6 illustrates a perspective view of user 190 completing the process by overlaying flap 119 on top of label 192. In this manner, user 190 or any third party may view the contents of media 192 through transparent flap 119.

Figure 7A:
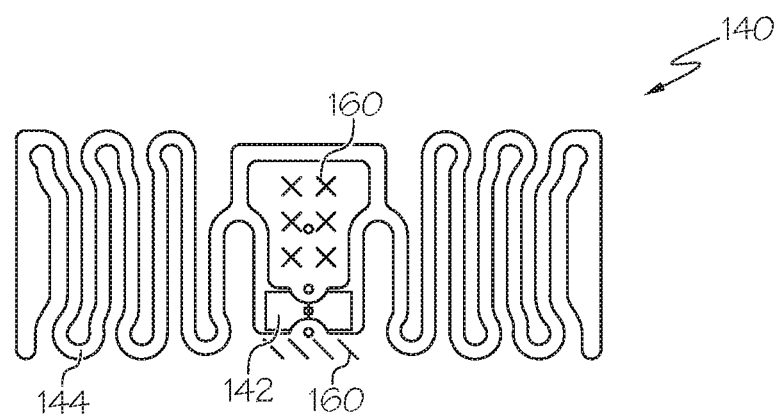
FIG. 7A illustrates a top view of a RFID inlay that can be used with the wearable RFID device of the present invention in accordance with the disclosed architecture.

FIG. 7A illustrates a top view of one embodiment of RFID inlay 140, which may be any RFID inlay capable of receiving, transmitting and/or storing information via RFID, such as the AD-321r6 RFID inlay which is currently manufactured and sold by Avery Dennison Corporation of Pasadena, California, but that also comprises a plurality of security slits or tamper-proof cuts 160 thereon, the usefulness of which is further described below. By way of background and not limitation, ultra-high frequency RFID inlay 140 is typically comprised of an integrated circuit or microchip 142 that stores information and a relatively small coil of aluminum, copper, silver or other metallic wires that form an antenna 144, which is capable of transmitting and receiving radio frequency signals (not shown). More specifically, data or other information from microchip 142 passes to antenna 144, where it is read by the antenna of an RFID reader (not shown) and passed onto a host computer system (also not shown) for archival purposes, processing or analysis. RFID inlay 140 may be classified as "wet" or "dry." RFID inlays are considered "wet" if an adhesive is applied to the inlay to adhere it to a pressure-sensitive liner that comprises the RFID label. Inlays are considered "dry" when the inlay is attached to the label without the use of an adhesive. RFID inlay 140 may also be a pre-cut inlay or a cut-on press inlay. Notwithstanding, as illustrated below, none of the forgoing should be construed as limitations, as those of ordinary skill in the art will appreciate that many other types of RFID inlays may be used with device 100 without affecting the overall scope of the invention. For example, both single RFID inlay and dual RFID inlay construction may be employed as part of the present invention to suit user preference, as more fully explained below.

Figure 7B:
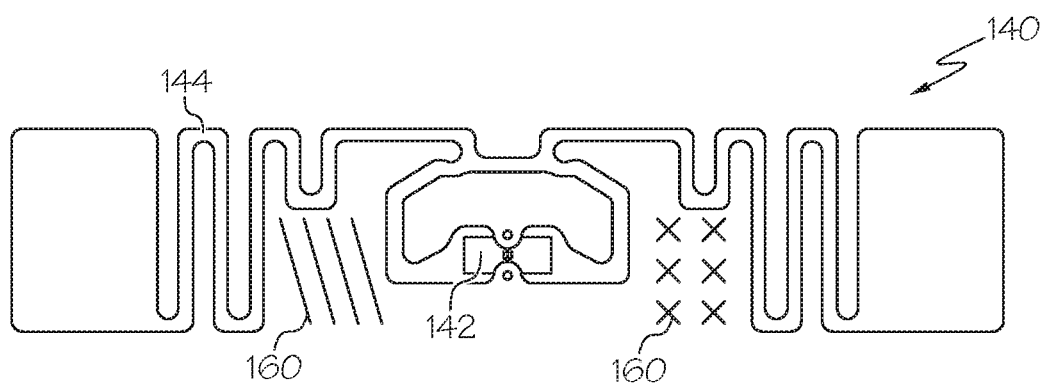
FIG. 7B illustrates a top view of an alternative RFID inlay that can be used with the wearable RFID device of the present invention in accordance with the disclosed architecture.

FIG. 7B illustrates a top view of an alternative embodiment of RFID inlay 140 that can be used with the wearable RFID device of the present invention in accordance with the disclosed architecture and that also comprises a plurality of security slits or tamper-proof cuts 160 thereon, the usefulness of which is further described below. More specifically, FIG. 7B illustrates AD-321r6 RFID inlay, which is also currently manufactured and sold by Avery Dennison Corporation of Pasadena, California and also comprises a chip 142 and an antenna 144 in communication therewith.

Figure 8A:
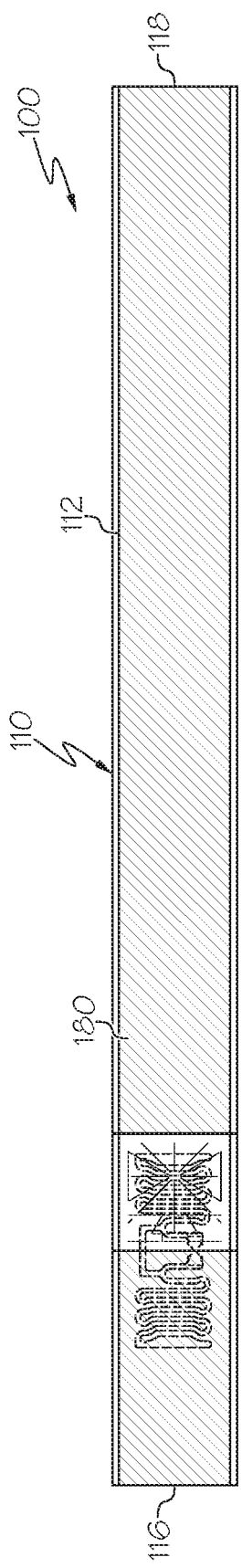
FIG. 8A illustrates a perspective view of the front of one embodiment of a wearable RFID device of the present invention in accordance with the disclosed architecture.
Figure 8B:
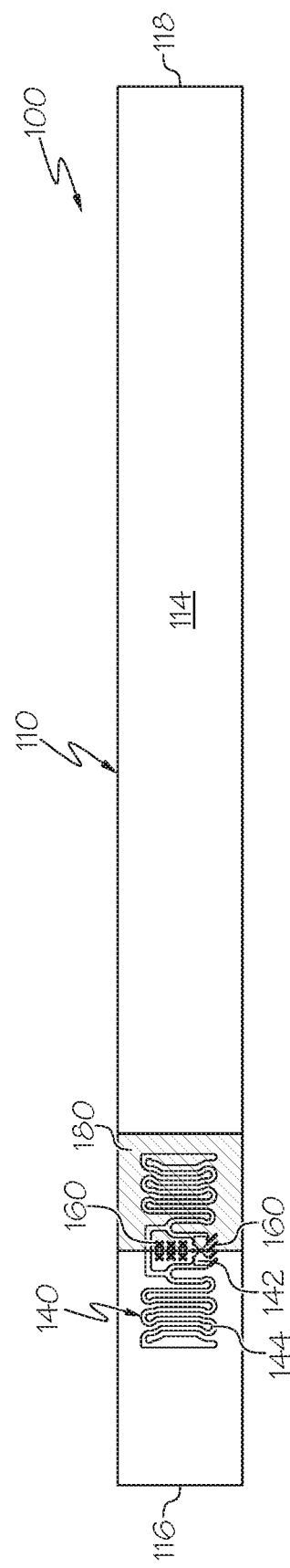
FIG. 8B illustrates a perspective view of the back of the wearable RFID device of FIG. 8A with one embodiment of the RFID inlay of the present invention disclosed thereon.

FIGS. 8A and 8B illustrate a perspective view of one embodiment of RFID device 100 in which adhesive 180 is positioned along a substantial portion of front 112 and a smaller portion of back 114, and in which RFID inlay 140 (in this example, Avery Dennison AD-321r6 RFID Inlay) is positioned on the back 114 of band 110 near first end 116. Adhesive 180 may be any adhesive known in the art such as permanent, or removable and is used to secure first and second ends 116, 118 to form band 110 and adhesive closure 130. In this particular embodiment, it is important to note that the adhesive 180 on back 114 (i) does not extend all the way to first end 116, thereby enabling the formation of flap 119 and (ii) does extend at least partially onto or underneath RFID inlay 140 and tamper-resistant cuts 160 such that RFID inlay 140 will be destroyed or rendered unusable if device 100 is removed from user 190. Importantly, the presence of adhesive 180 and the placement of tamper-proof cuts or slits 160 within RFID inlay 140, or on band 110 in close proximity thereto, provide a weakened or fault area in which failure will likely occur if the device 100 is forcibly removed from user 190.

FIGS. 8C and 8D illustrate a perspective view of an alternative embodiment of RFID device 100 in which adhesive 180 is positioned along a substantial portion of front 112 and a smaller portion of back 114, and in which RFID inlay 140 (in this example, Avery Dennison AD-237mR6 RFID inlay) is positioned on the back 114 of band 110 near first end 116. Adhesive 180 is used to secure first and second ends 116, 118 to form band 110 and adhesive closure 130. In this particular embodiment, it is important to note that the adhesive 180 on back 114 (i) does not extend all the way to first end 116, thereby enabling the formation of flap 119 and (ii) does extend at least partially onto or underneath RFID inlay 140 and tamper-proof cuts 160 such that RFID inlay 140 will be destroyed or rendered unusable if device 100 is removed from user 190 for the reasons discussed above.

Figure 9A:
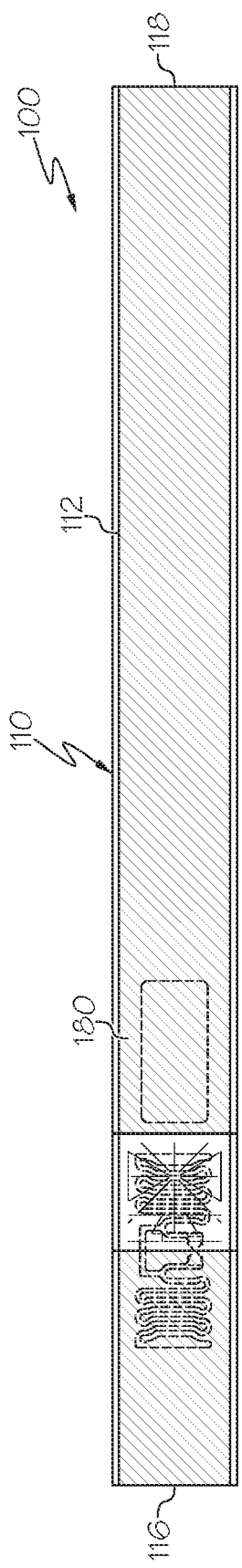
FIG. 9A illustrates a perspective view of the front of a further alternative embodiment of a wearable RFID device of the present invention in accordance with the disclosed architecture.
Figure 9B:
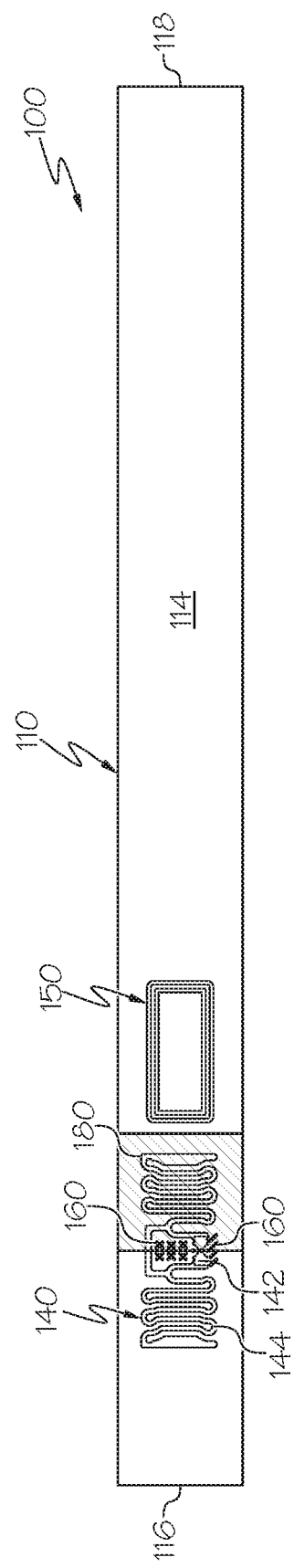
FIG. 9B illustrates a perspective view of the back of the wearable RFID device of FIG. 9A with one embodiment of the RFID inlay of the present invention and a second RFID inlay disclosed thereon.

FIGS. 9A and 9B illustrate a perspective view of an alternative embodiment of RFID device 100 further comprising a second RFID inlay 150. Second RFID inlay 150 may be similar to RFID inlay 140 in structure and function, or it may be different, such as a high frequency RFIF inlay, as is known in the art. The RFID inlays 140, 150 may be linked together by common identification written to their respective memory banks, including EPC/memory for the ultra-high frequency RFID inlays and memory banks for the high frequency RFID inlays. In this particular embodiment, adhesive 180 is positioned along a substantial portion of front 112 and a smaller portion of back 114, and both RFID inlay 140 (in this example, Avery Dennison AD-321r6 RFID inlay) and second RFID inlay 150 are positioned on the back 114 of band 110 near first end 116, as best shown in FIG. 9B. Adhesive 180 is used to secure first and second ends 116, 118 to form band 110 and adhesive closure 130. In this particular embodiment, it is also important to note that the adhesive 180 on back 114 (i) does not extend all the way to first end 116, thereby enabling the formation of flap 119 and (ii) does extend at least partially onto or underneath RFID inlay 140 and tamper-proof cuts 160 such that RFID inlay 140 will be destroyed or rendered unusable if device 100 is removed from user 190 for the reasons discussed above.

Figure 9C:
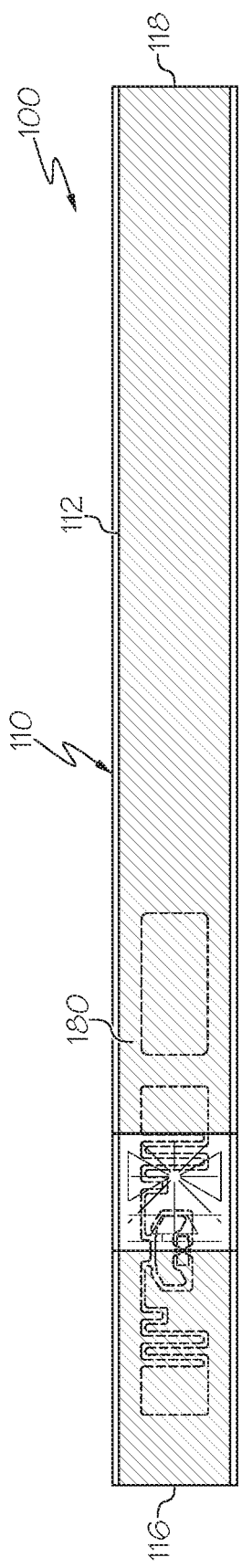
FIG. 9C illustrates a perspective view of the front of a further alternative embodiment of a wearable RFID device of the present invention in accordance with the disclosed architecture.
Figure 9D:
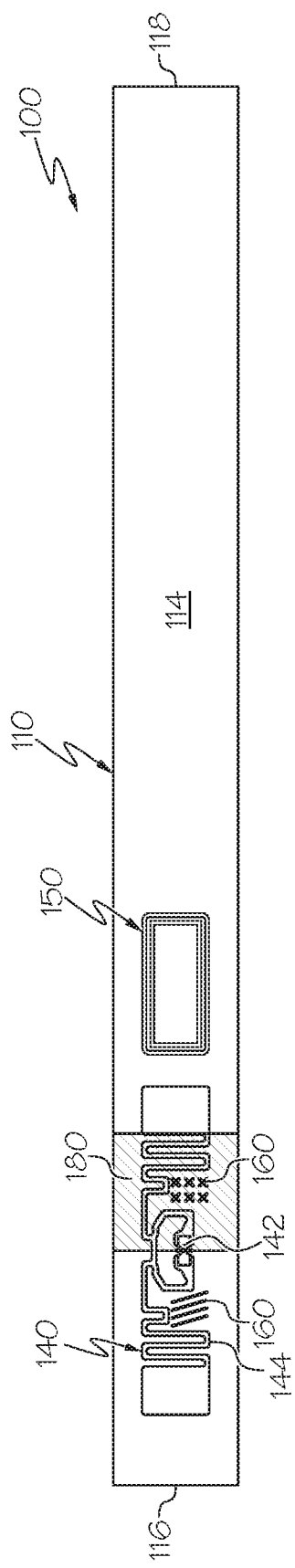
FIG. 9D illustrates a perspective view of the back of the wearable RFID device of FIG. 9C with an alternative embodiment of the RFID inlay of the present invention and a second RFID inlay disclosed thereon.

FIGS. 9C and 9D illustrate a perspective view of a further alternative embodiment of RFID device 100 also comprising a second RFID inlay 150. In this particular embodiment, adhesive 180 is positioned along a substantial portion of front 112 and a smaller portion of back 114, and both RFID inlay 140 (in this example, Avery Dennison AD-237mR6 RFID Inlay) and second RFID inlay 150 are positioned on the back 114 of band 110 near first end 116, as best shown in FIG. 9D. Adhesive 180 is used to secure first and second ends 116, 118 to form band 110 and adhesive closure 130. In this particular embodiment, it is also important to note that the adhesive 180 on back 114 (i) does not extend all the way to first end 116, thereby enabling the formation of flap 119 and (ii) does extend at least partially onto or underneath RFID inlay 140 and tamper-proof cuts 160 such that RFID inlay 140 will be destroyed or rendered unusable if device 100 is removed from user 190 for the reasons discussed above.

FIGS. 10A and 10B illustrate a perspective view of a further embodiment of RFID device 100 in which adhesive 180 is positioned along a substantial portion of front 112 and a smaller portion of back 114, and in which RFID inlay 140 (in this example, Avery Dennison AD-321r6 RFID Inlay) is positioned on the back 114 of band 110 immediately adjacent to first end 116. Adhesive 180 is used to secure first and second ends 116, 118 to form band 110 and adhesive closure 130. In this particular embodiment, it is important to note that the adhesive 180 on back 114 (i) does not extend all the way to first end 116, thereby enabling the formation of flap 119 and (ii) does not extend onto or underneath RFID inlay 140 and tamper-proof cuts 160. Rather, tamper-proof cuts or slits 160 are also positioned along the portion of front 112 without adhesive 180 thereon, which will enable failure of device 100 at that location, as well as at the location of tamper-proof cuts or slits 160 in RFID inlay 140. In one instance, The Inlay may remain intact when security is not necessarily a requirement. As the wristband has an extended "wing" the security cut will break if a wing becomes caught on a foreign object.

Figure 10C:
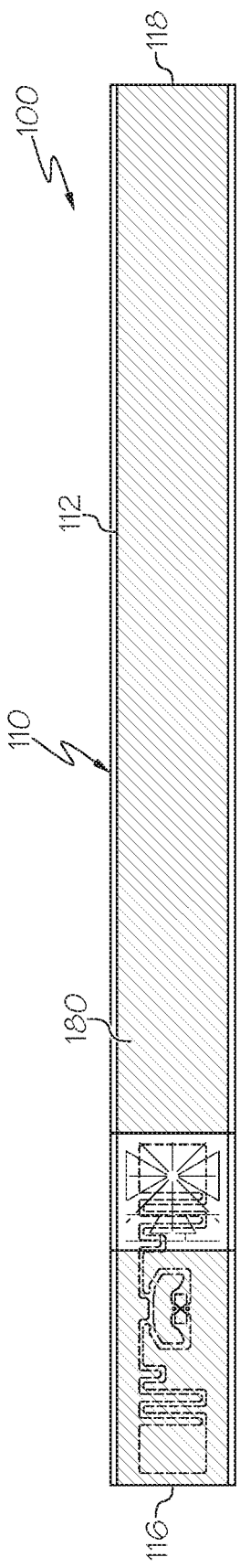
FIG. 10C illustrates a perspective view of the front of a further alternative embodiment of a wearable RFID device of the present invention in accordance with the disclosed architecture.
Figure 10D:
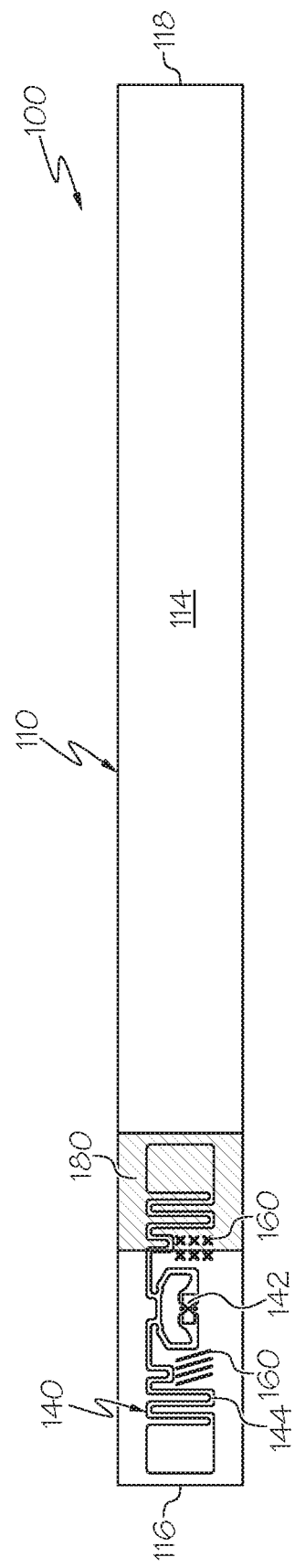
FIG. 10D illustrates a perspective view of the back of the wearable RFID device of FIG. 10C with an alternative embodiment of the RFID inlay of the present invention disclosed thereon.

FIGS. 10C and 10D illustrate a perspective view of a further alternative embodiment of RFID device 100 in which adhesive 180 is positioned along a substantial portion of front 112 and a smaller portion of back 114, and in which RFID inlay 140 (in this example, Avery Dennison AD-237mR6 RFID Inlay) is positioned on the back 114 of band 110 immediately adjacent to first end 116. Adhesive 180 is used to secure first and second ends 116, 118 to form band 110 and adhesive closure 130. In this particular embodiment, it is important to note that the adhesive 180 on back 114 (i) does not extend all the way to first end 116, thereby enabling the formation of flap 119, (ii) does extend at least partially underneath tamper-proof cuts 160 formed in front 112 of band 110 and (iii) does extend at least partially onto or underneath RFID inlay 140 and tamper-proof cuts 160 such that RFID inlay 140 will be destroyed or rendered unusable if device 100 is removed from user 190 for the reasons discussed above.

Figure 11A:
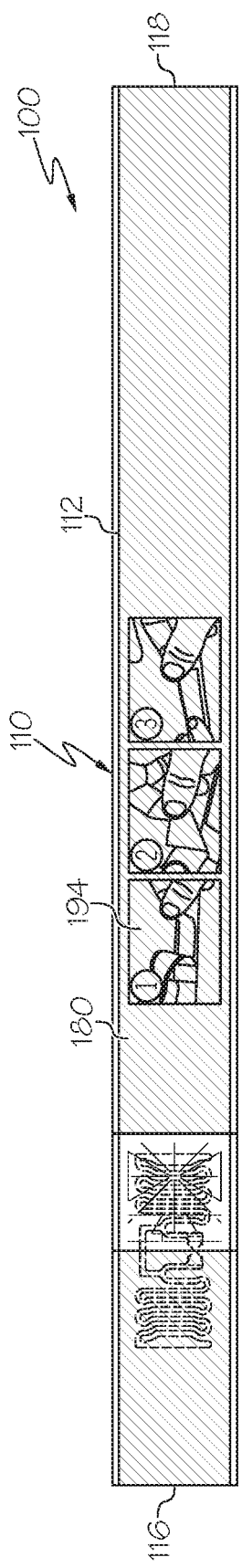
FIG. 11A illustrates a perspective view of the front of a further alternative embodiment of a wearable RFID device of the present invention in accordance with the disclosed architecture.
Figure 11B:
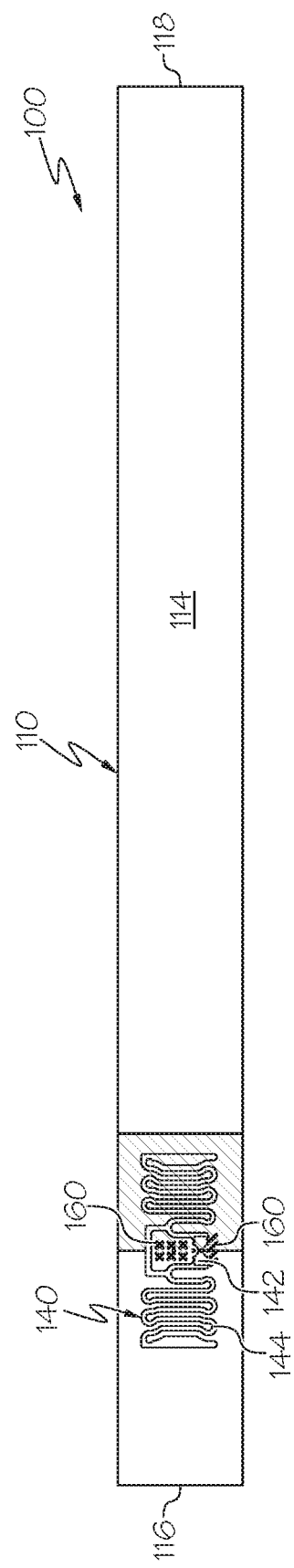
FIG. 11B illustrates a perspective view of the back of the wearable RFID device of FIG. 11A with one embodiment of the RFID inlay of the present invention disclosed thereon.

FIGS. 11A and 11B illustrate a perspective view of yet another embodiment of RFID device 100 in which adhesive 180 is positioned along a substantial portion of front 112 and a smaller portion of back 114, and in which RFID inlay 140 (in this example, Avery Dennison AD-321r6 RFID Inlay) is positioned on the back 114 of band 110 near first end 116. Adhesive 180 is used to secure first and second ends 116, 118 to form band 110 and adhesive closure 130. In this particular embodiment, front 112 may further comprise a plurality of graphical or textual instructions 194 for informing a user how to apply media 192 to band 110 and secure it with flap 119. In this particular embodiment, it is also important to note that the adhesive 180 on back 114 (i) does not extend all the way to first end 116, thereby enabling the formation of flap 119 and (ii) does extend at least partially onto or underneath RFID inlay 140 and tamper-proof cuts 160 such that RFID inlay 140 will be destroyed or rendered unusable if device 100 is removed from user 190 for the reasons discussed above.

FIGS. 11C and 11D illustrate a perspective view of yet another alternative embodiment of RFID device 100 in which adhesive 180 is positioned along a substantial portion of front 112 and a smaller portion of back 114, and in which RFID inlay 140 (in this example, Avery Dennison AD-237mR6 RFID Inlay) is positioned on the back 114 of band 110 near first end 116. Adhesive 180 is used to secure first and second ends 116, 118 to form band 110 and adhesive closure 130. In this particular embodiment, front 112 may further comprise a plurality of graphical or textual instructions 194 for informing a user how to apply media 192 to band 110 and secure it with flap 119. It is also important to note that the adhesive 180 on back 114 in this particular embodiment (i) does not extend all the way to first end 116, thereby enabling the formation of flap 119 and (ii) does extend at least partially onto or underneath RFID inlay 140 and tamper-proof cuts 160 such that RFID inlay 140 will be destroyed or rendered unusable if device 100 is removed from user 190 for the reasons discussed above.

Figure 12A:
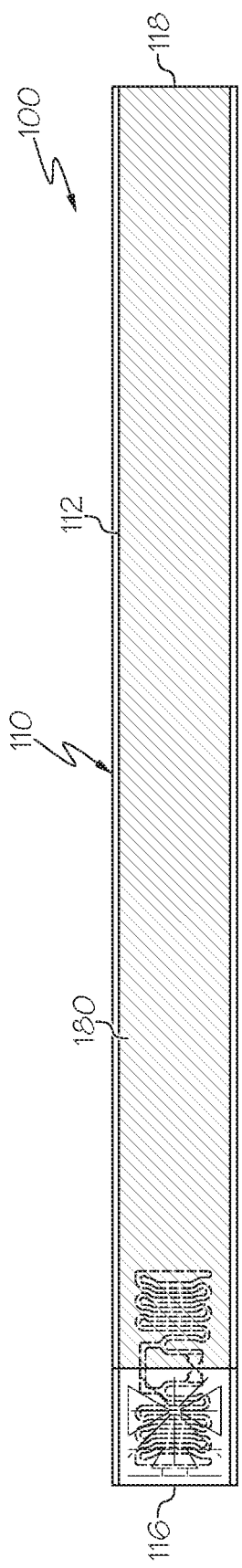
FIG. 12A illustrates a perspective view of the front of a further alternative embodiment of a wearable RFID device of the present invention in accordance with the disclosed architecture.
Figure 12B:
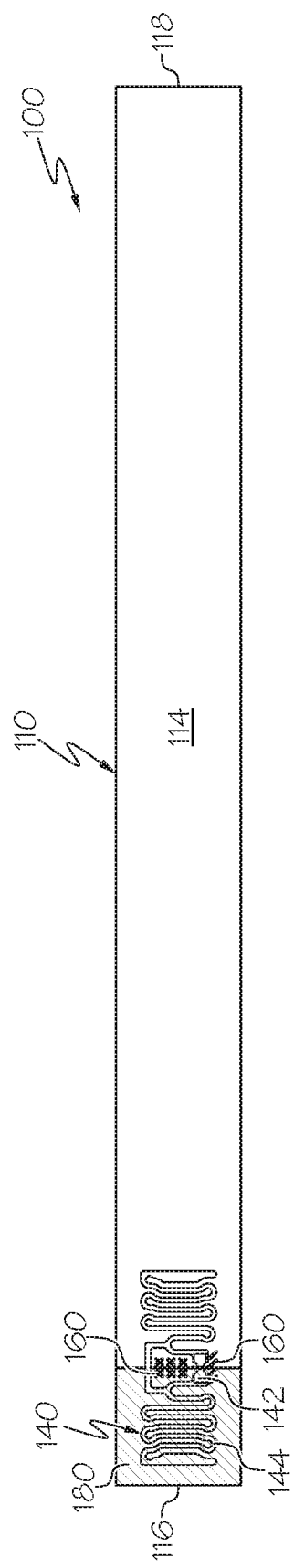
FIG. 12B illustrates a perspective view of the back of the wearable RFID device of FIG. 12A with one embodiment of the RFID inlay of the present invention disclosed thereon.

FIGS. 12A and 12B illustrate a perspective view of yet another embodiment of RFID device 100 in which adhesive 180 is positioned along a substantial portion of front 112 (but not immediately adjacent to first end 116) and a smaller portion of back 114 immediately adjacent to first end 116, and in which RFID inlay 140 (in this example, Avery Dennison AD-321r6 RFID Inlay) is also positioned on the back 114 of band 110 immediately adjacent to first end 116. Adhesive 180 is used to secure first and second ends 116, 118 to form band 110 and adhesive closure 130. In this particular embodiment, it is important to note that the adhesive 180 on back 114 (i) does extend all the way to first end 116 and (ii) does extend onto or underneath at least a portion of RFID inlay 140 and tamper-proof cuts 160 such that RFID inlay 140 will be destroyed or rendered unusable if device 100 is removed from user 190 for the reasons discussed above.

Figure 12C:
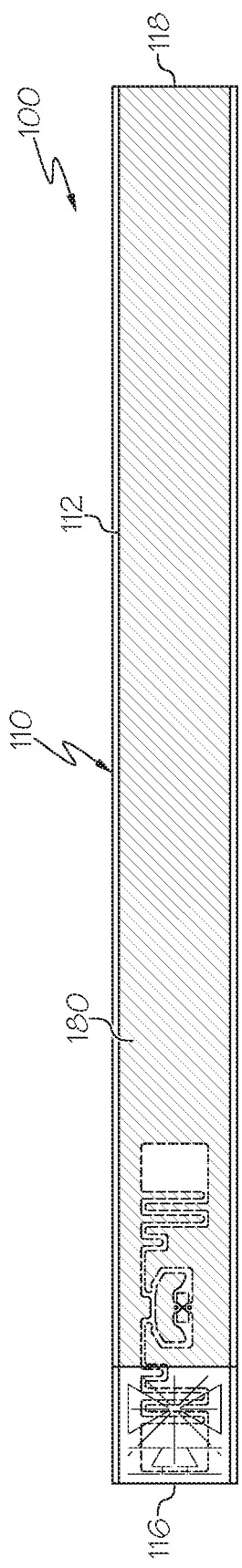
FIG. 12C illustrates a perspective view of the front of a further alternative embodiment of a wearable RFID device of the present invention in accordance with the disclosed architecture.
Figure 12D:
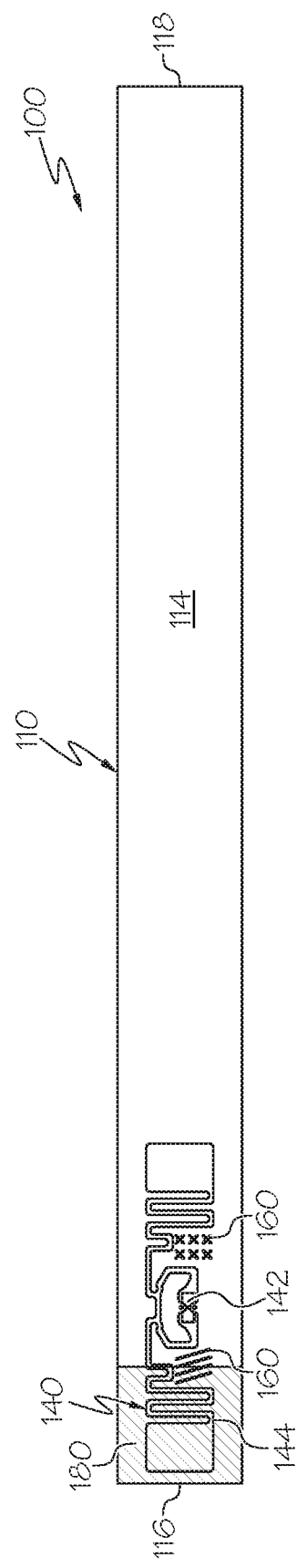
FIG. 12D illustrates a perspective view of the back of the wearable RFID device of FIG. 12C with an alternative embodiment of the RFID inlay of the present invention disclosed thereon.

FIGS. 12C and 12D illustrate a perspective view of a further alternative embodiment of RFID device 100 in which adhesive 180 is positioned along a substantial portion of front 112 (but not immediately adjacent to first end 116) and a smaller portion of back 114 immediately adjacent to first end 116, and in which RFID inlay 140 (in this example, Avery Dennison AD-237mR6 RFID Inlay) is positioned on the back 114 of band 110 immediately adjacent to first end 116. Adhesive 180 is used to secure first and second ends 116, 118 to form band 110 and adhesive closure 130. In this particular embodiment, it is important to note that the adhesive 180 on back 114 (i) does extend all the way to first end 116 and (ii) does extend at least partially onto or underneath RFID inlay 140 and tamper-proof cuts 160 such that RFID inlay 140 will be destroyed or rendered unusable if device 100 is removed from user 190 for the reasons discussed above.

The device 100 of the present invention may be digitally printed and can be prepared with a thermal printer in either roll form or fan folded, and cut to user specifications. Many different potential embodiments have been disclosed herein including, without limitation; devices that have: (i) an RFIF inlay that extends under and past the adhesive closure (i.e., the overlapping of first end 116 and second end 118) of band 110 with tamper or security cuts 160 above adhesive closure 130; (ii) an RFID inlay 140 with the leading edge (i.e., in the direction of first end 116) under adhesive closure 130 which has the tamper resistant cuts 160; or (iii) a first RFID inlay 140 that extends past adhesive closure 130 in the direction of first end 116 and a second RFID inlay 150 that does not.

Notwithstanding, what has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wearable RFID device for accepting and storing information comprising:
    a band with a first end and an opposing second end;
    a RFID inlay attached to the band near the first end of the band;
    at least one security cut in the band that extends into the RFID inlay; and
    an adhesive positioned along a substantial portion of a front and smaller portion of a back of the band, wherein the RFID inlay is positioned on the back of the band immediately adjacent to the first end; wherein the adhesive on the back does not extend all the way to the first end enabling formation of a flap, and does not extend onto or underneath the RFID inlay and the security cut; and wherein the at least one security cut is positioned along the portion of the front of the band without adhesive thereon.

2. The RFID device of claim 1, wherein the band comprises a base layer, a laminate layer and a flap positioned at the first end of said band.

3. The RFID device of claim 1, wherein the RFID inlay is a pre-cut inlay comprised of a microchip and an antenna.

4. The RFID device of claim 1, wherein the RFID inlay is a cut on press inlay comprised of a microchip and an antenna.

5. The RFID device of claim 1, wherein the RFID inlay is positioned on a back side of the band.

6. The RFID device of claim 1, wherein the adhesive closure is positioned along the RFID inlay and a portion of the RFID inlay extends beyond the adhesive closure in the direction of the first end.

7. The RFID device of claim 1, wherein the RFID inlay is positioned between the adhesive closure and the first end.

8. The RFID device of claim 1, wherein the adhesive closure is positioned along the RFID inlay.

9. The RFID device of claim 1 further comprising a second RFID inlay.

10. The RFID device of claim 9 wherein the second RFID inlay is linked to the RFID inlay.

* * * * *